March 29, 1932.  R. A. CHRISTIE  1,851,942

FIBER OR PAPER SPOON

Filed March 28, 1930

INVENTOR

Robert A. Christie

BY Augustus B. Stoughton

ATTORNEY.

WITNESS:

Patented Mar. 29, 1932

1,851,942

UNITED STATES PATENT OFFICE

ROBERT A. CHRISTIE, OF GLENSIDE, PENNSYLVANIA, ASSIGNOR TO PAPERCRAFT CORPORATION, OF ELKINS PARK, PENNSYLVANIA, A CORPORATION OF PENNSYLVANIA

FIBER OR PAPER SPOON

Application filed March 28, 1930. Serial No. 439,712.

Fiber or paper spoons are extensively used but they are relatively weak at and near the union of the handle and bowl, and this is an objectionable feature.

The principal object of the present invention is to obviate the defect above referred to and to provide adequate structural strength at and near the union of the handle and bowl.

Other objects of the invention will appear from the following description at the end of which the invention will be claimed.

Generally stated, the invention consists in a fiber or paper spoon having a channel extending from its handle into its bowl and provided at and near the union of the handle and bowl with marginal extensions, said extensions being folded or turned back onto the outside of the bowl and inside of the handle, providing a reinforcement.

The invention also comprises the improvements to be presently described and finally claimed.

In the following description reference will be made to the accompanying drawings forming part hereof and in which Figure 1 is a top or plan view illustrating a blank from which the spoon may be formed.

Fig. 6 is a rear view

In the following description and claims reference will be made to a spoon, but those skilled in the art will understand that it applies to and includes a fork which in substance is a spoon with tines cut in its bowl portion. Likewise reference will be made to fiber, meaning the material generally so designated in the art and including what may be called paper and like material.

Figure 4:
Fig. 4 is a section on the line 4—4 of Fig. 2.
Figure 5:
Fig. 5 is an end view looking from right to left in Fig. 3.

In the drawings 1 represents a channel extending from the handle 2 into the bowl 3. At and near the union of the handle and bowl are provided marginal extensions 4 conforming to the walls of the concavity of the channel, Fig. 4, and to the convex wall of the bowl. The extensions 4 are part of the blank, Fig. 1, and they are folded and turned back onto the outside of the bowl and into the hollow channel of the handle thus providing a re-inforcement.

Figure 1:
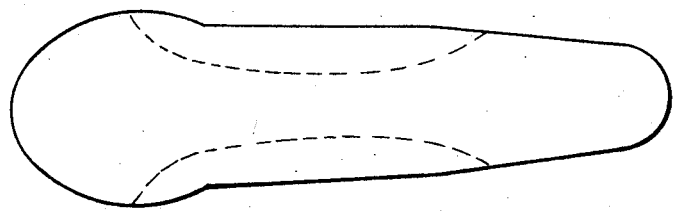
Figure 2:
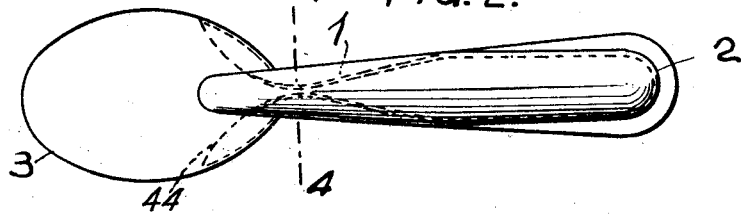
Fig. 2 is a top or plan view of the finished spoon.
Figure 3:
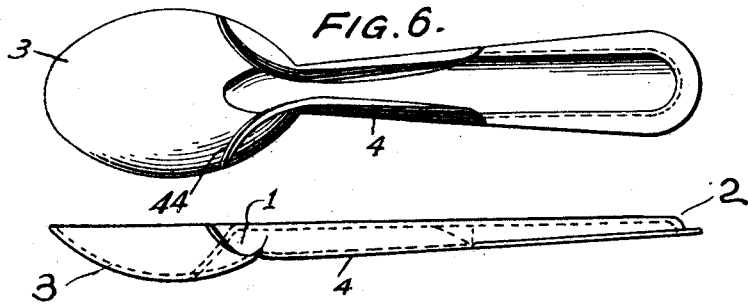
Fig. 3 is a side view of the same.

The construction of the spoon will perhaps be best understood from a consideration of the evolution of the finished article shown in Figs. 2 to 6, inclusive, from the blank shown in Figure 1. In the blank shown in Figure 1 the marginal extensions 4 and 44 which form the reenforcements are bent on the dotted lines shown in Figure 1 so that the portions 4 are folded up into the channel 1 conforming to the sides of the inner wall of the channel. The marginal extensions 44 are bent into contact with the rear or convex surface of the bowl 3 and form a reenforcement for the edge of the bowl and a reenforcing connection between the bowl 3 and the handle 2.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A fiber spoon having a channel extending from its handle into its bowl and provided at and near the union of the handle and bowl with marginal extensions conforming to the walls of the concavity of the channel and to the convex wall of the bowl.

2. A fiber spoon having a channel extending from its handle into its bowl and provided at and near the union of the handle and bowl with marginal extensions, said extensions being folded and turned into contact with the bowl and handle, providing a re-inforcement.

ROBERT A. CHRISTIE.